(No Model.)

G. H. ENNIS.
CAKE OR BREAD BOX.

No. 480,718. Patented Aug. 16, 1892.

WITNESSES:
Jacob L. Rowe.
Wm. Montstorm

INVENTOR
George H. Ennis

UNITED STATES PATENT OFFICE.

GEORGE H. ENNIS, OF TROY, NEW YORK, ASSIGNOR TO JESSIE D. ENNIS, OF SAME PLACE.

CAKE OR BREAD BOX.

SPECIFICATION forming part of Letters Patent No. 480,718, dated August 16, 1892.

Application filed June 18, 1890. Serial No. 355,901. (No model.)

*To all whom it may concern:*

Be it known that I, GEORGE H. ENNIS, a citizen of the United States, residing at the city of Troy, in the county of Rensselaer and State of New York, have invented a new and useful Improvement in Cake or Bread Boxes, of which the following is a specification.

The object of my invention is to provide a cake or bread box which will not only serve as a convenient receptacle for cake or bread, but will preserve the contents from flying dust, sudden changes of the temperature, and insects.

Figure 1:
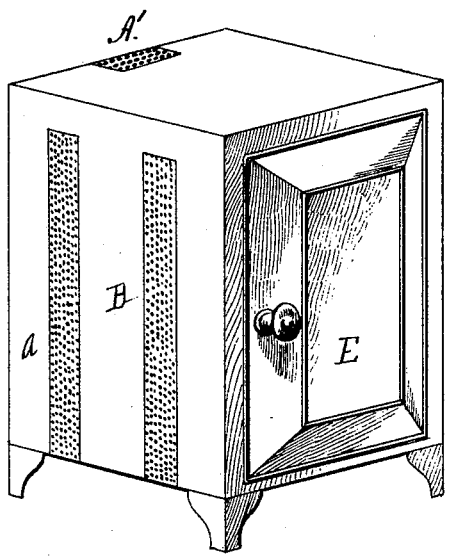
Figure 2:
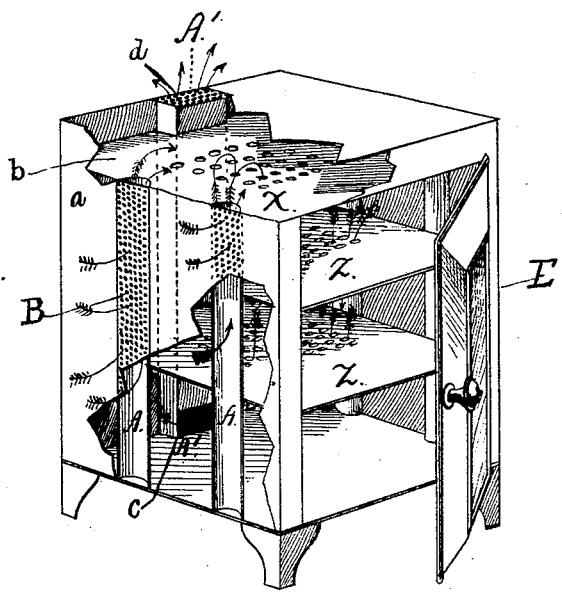

In the accompanying drawings, Figure 1 is a perspective view of my improved cake-box. Fig. 2 is a corresponding view, portions being broken away to disclose the interior construction.

In both the views letter A designates a series of vertical flues on the inner sides of the shell or casing $a$ of the box.

In Fig. 1 the shell or casing is provided with numerous minute perforations B alongside the flues and extending from the bottom to near the top, admitting air into the flues, the air passing upward, as indicated by the arrows, into a chamber $b$, extending from side to side at the top of the box. From thence the air passes down through a perforation or sieve-like diaphragm $x$, that constitutes the bottom of the chamber, so that it is diffused through the interior of the box and among its contents, which are supported on the perforated shelves $z$.

To further insure a full and free circulation of air downward among the contents of even the lowest portion of the box, I provide in the box shown in Figs. 1 and 2 an extra internal flue A′, extending from the bottom to the top of the box, though not having side perforations, like flues A, communicating through the shell or casing with the outer air, but having instead an air-receiving opening or mouth $c$ at or near the bottom of the box, as shown, and an air-exit opening through the top of the box. This top opening is covered with sieving $d$ of a mesh sufficiently close to prevent the entrance of insects.

E is a door through which access may be had to the interior.

What I claim is—

In a cake, bread, or like food vessel, the combination of the casing, flues A at the sides of the casing, having numerous air-inlets at its side and opening at the top into the interior of the casing, flue A′, open at the bottom and passing through the top of the casing, and a perforated diaphragm $x$, located sufficiently far below the top of the casing to leave an ample air-circulating chamber between them, substantially as set forth.

GEORGE H. ENNIS.

Witnesses:
 FRED TAPLIN,
 T. FRANK REARDON.